(No Model.) 2 Sheets—Sheet 1.

W. H. HARRIS.
MOLD FOR FORMING CASTINGS.

No. 340,043. Patented Apr. 13, 1886.

Witnesses.
Theodore L. Popp.
Geo. J. Buchheit Jr.

W. H. Harris Inventor.
By Wilhelm Bonner.
Attorneys.

N. PETERS, Photo-Lithographer, Washington, D. C.

(No Model.) 2 Sheets—Sheet 2.
W. H. HARRIS.
MOLD FOR FORMING CASTINGS.
No. 340,043. Patented Apr. 13, 1886.
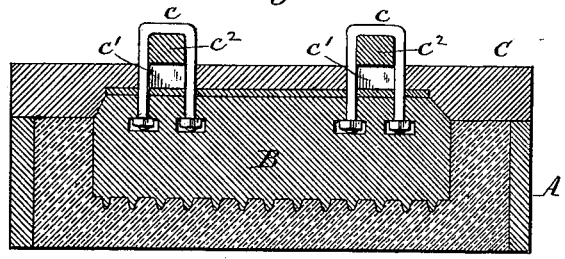
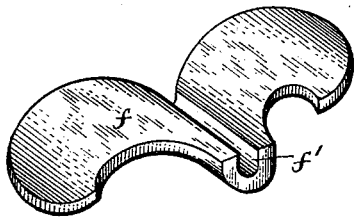
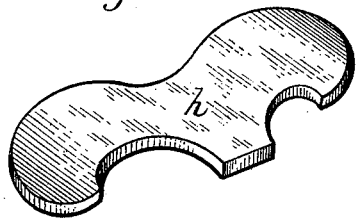
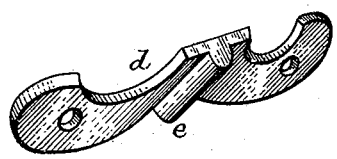
Witnesses:
Theodore L. Popp
Geo. J. Buchheit Jr.
W. H. Harris Inventor.
By Wilhelm Bonner.
Attorneys.

UNITED STATES PATENT OFFICE.

WILLIAM H. HARRIS, OF BUFFALO, NEW YORK, ASSIGNOR TO JENNETTE E. HARRIS, OF SAME PLACE.

MOLD FOR FORMING CASTINGS.

SPECIFICATION forming part of Letters Patent No 340,043, dated April 13, 1886.

Application filed December 17, 1885. Serial No. 185,977. (No model.)

*To all whom it may concern:*

Be it known that I, WILLIAM H. HARRIS, of the city of Buffalo, in the county of Erie and State of New York, have invented new and useful Improvements in Molds for Forming Castings, of which the following is a specification.

This invention relates to improvements in molds for forming hollow castings, such as radiator-sections and the like.

The object of the invention is to simplify the operation of molding these castings, whereby more uniform castings are produced with less labor and expense and in less time than heretofore.

The invention consists of the improvements which will be hereinafter fully described, and pointed out in the claim.

Figure 1:
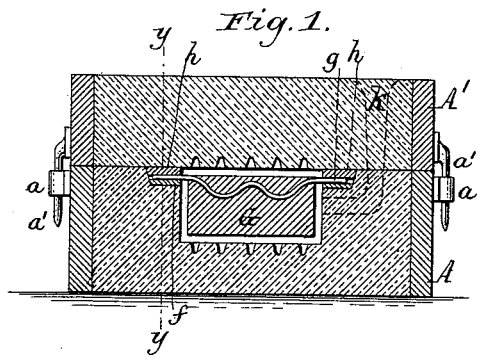
Figure 3:
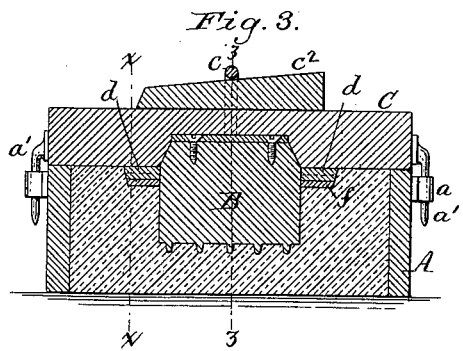
Figure 4:
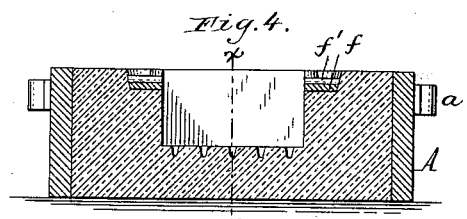
Figure 2:
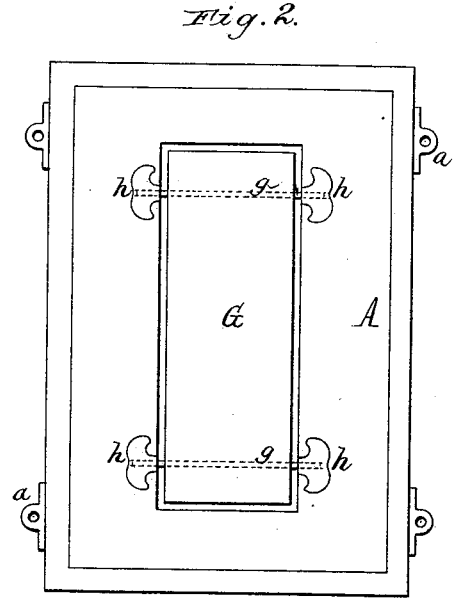
Figure 5:
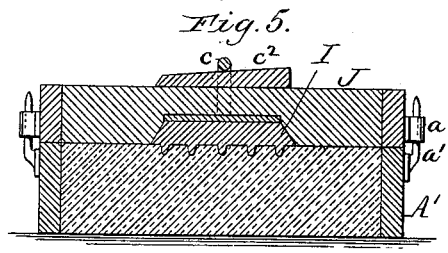
Figure 7:
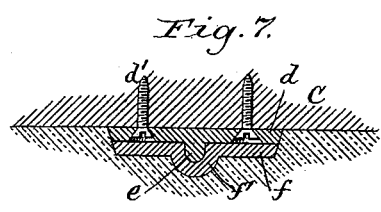
Figure 6:
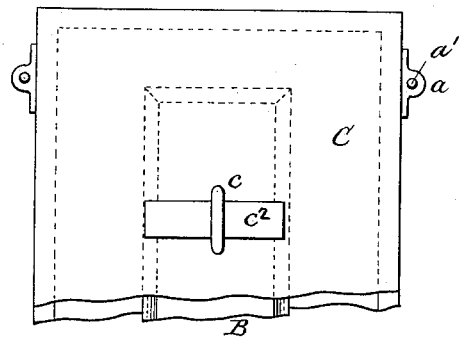
Figure 8:
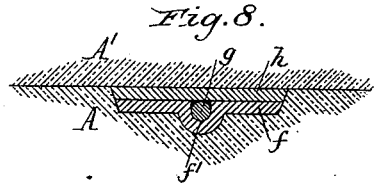

In the accompanying drawings, consisting of two sheets, Figure 1 represents a vertical cross-section of a mold containing my improvements, the mold being in position for casting. Fig. 2 represents a top plan view of the lower portion of the mold, showing the core in position. Fig. 3 is a vertical cross-section of the lower portion of the mold with the follower-board and pattern in position and ready to be removed from the sand. Fig. 4 is a similar view with the follower-board and pattern removed, the mold being in position to receive the core. Fig. 5 is a vertical cross-section of the cope or upper portion of the mold with the follower-board and pattern in place. Fig. 6 is a fragmentary top plan view showing the means of securing the pattern to the follower-board. Fig. 7 is a fragmentary vertical cross-section in line $x\,x$, Fig. 3, on an enlarged scale. Fig. 8 is a vertical cross-section in line $y\,y$, Fig. 1, on an enlarged scale. Fig. 9 is a longitudinal sectional elevation in line $z\,z$, Fig. 3. Fig. 10 is a longitudinal section in line $x\,x$, Fig. 4. Fig. 11 is a perspective view of one of the cap-plates. Fig. 12 is a perspective view of one of the grooved plates. Fig. 13 is a perspective view of one of the ribbed plates which are attached to the follower-board.

Like letters of reference refer to like parts in the several figures.

A represents the lower part of the flask, and A′ the upper part or cope of the flask, the lower part, A, being provided with the usual lugs, $a$, on its sides, having openings, which receive the pins $a'$, secured to the sides of the cope A′, and whereby the two parts of the flask are held in place one upon the other.

B represents the pattern, whereby the two sides, the ends, and the bottom of mold are formed in the lower flask, A. The pattern B is attached to a follower-board, C, by handles or loops $c$, which are inserted through slots or elongated openings $c'$, formed in the board C, and wedges $c^2$, which are driven through the portion of the loops $c$ which project beyond the top of the board C. The board C is provided with pins $a'$, which engage in the openings in the lugs $a$ of the flask A, and retain the board in its proper place on the flask. In forming this portion of the mold, the board C, with the pattern B attached thereto, and the flask A are inverted from the position shown in Fig. 3, so that the flask A will rest upon the board C, with the pattern B seated thereon and surrounded by the flask. When the parts are in this position, the flask A is filled with sand, which is rammed in the usual manner to form the mold around the pattern B. The flask, with the board C, is then reversed or turned over to the position shown in Fig. 3. The board C is now detached from the pattern by removing the wedges $c^2$, and is lifted off from the flask, leaving the pattern embedded in the sand. The pattern is now removed from the sand by taking hold of the handles or loops $c$, leaving the mold formed in the sand, as shown in Fig. 4.

$d$ represents four plates secured to the follower-board C, near the four corners of the pattern B, by screws $d'$. The plates $d$ are each provided with a horizontal rib, $e$, which extends across the face of the plate at right angles to the sides of the pattern.

$f$ are loose plates or caps, similar in form to the plates $d$, and each provided with a groove, $f'$, which corresponds with the rib $e$ on the plates $d$. The plates or caps $f$ are placed on the plates $d$ before the flask A is filled with sand and while it is in an inverted position from that shown in Figs. 3 and 7, so that when the flask A is turned over and the board and pattern are removed from the sand the plates $f$ will remain embedded in the sand with their inner edges in line with the sides of the mold and their grooved faces uppermost, as shown in Fig. 4.

G represents the core, which is inserted in the mold after removing the pattern B. The core G is provided with two rods, $g\ g$, which extend through the core—one near each end thereof—and with their ends projecting from opposite sides of the core, as shown in Figs. 1 and 2. The rods $g\ g$ are so arranged in the core that when the latter is inserted in its proper position in the mold the projecting ends of the rods $g\ g$ will rest in the grooves $f'$ of the plates $f$ and form supports for the core. By means of the rods $g$ and plates $f$ the core is readily inserted in its proper position in the mold.

When the core G has been placed in the mold, the caps $f$ are covered by flat plates $h$, which are similar in form to the plates $f$ and $d$. The plates $h$ cover the ends of the rods $g$, which are seated in the grooves $f'$, and the top of the plates $h$ are flush with the top surface of the flask A, so that when the upper flask or cope, A', is secured in place upon the flask A the ends of the rods $g$ will be firmly held in place by the plates $f$ and $h$, thus preventing any accidental displacement of the core in the mold.

The upper portion of the mold is formed similar to the lower portion, I being the pattern, which is attached to the follower-board J by loops or handles and wedges in the same manner in which the pattern B is fastened to the board C. The pattern I and board J being arranged in position, and the flask A' secured thereto, the latter is filled with sand and rammed in the usual manner, and then inverted to the position shown in Fig. 5, when the board and pattern are removed, leaving the mold formed in the sand. The flask A' is again reversed and placed in position upon the flask A, as shown in Fig. 1, when the mold is completed and ready for casting, the metal being passed through the gate $k$.

The core G occupies the entire center space of the mold, forming an open space between the sides and ends of the core and the mold for the metal, which forms a hollow casting having closed sides and ends.

By forming the molds in this manner both parts of the mold can be made at the same time by different persons, and by dispensing with the use of chaplets for supporting the core a great saving of time is effected and the core is more securely held in place than by the means heretofore employed.

I claim as my invention—

The combination, with a mold for forming castings, of a core, G, provided with projecting rods $g\ g$, grooved plates $f$, embedded in the mold and supporting the projecting rods of the core, and plates $h$, covering the grooved plates $f$, and confining the rods $g$ in the grooves thereof, substantially as set forth.

Witness my hand this 3d day of December, 1885.

W. H. HARRIS.

Witnesses:
 JNO. J. BONNER,
 CARL F. GEYER.